United States Patent [19]

Chang

[11] Patent Number: 4,769,780
[45] Date of Patent: Sep. 6, 1988

[54] HIGH SPEED MULTIPLIER

[75] Inventor: David C. Chang, Pleasant Valley, N.Y.

[73] Assignee: International Business Machines Corporation, Armonk, N.Y.

[21] Appl. No.: 828,408

[22] Filed: Feb. 10, 1986

[51] Int. Cl.[4] .................................................. G06F 7/52
[52] U.S. Cl. ..................................................... 364/760
[58] Field of Search ................................ 364/760, 739

[56] References Cited

U.S. PATENT DOCUMENTS

| | | | |
|---|---|---|---|
| 3,227,865 | 1/1966 | Hoernes | 364/739 |
| 4,041,292 | 8/1977 | Kindell | 364/760 |
| 4,153,938 | 5/1979 | Ghest et al. | 364/760 |
| 4,228,520 | 10/1980 | Letteney | 364/760 |
| 4,484,301 | 11/1984 | Borgerding et al. | 364/760 |
| 4,546,446 | 10/1985 | Machida | 364/760 X |

OTHER PUBLICATIONS

Larson, "High-Speed Multiply Using Four Input Carry-Save Adder" *IBM Tech. Disclosure Bulletin* vol. 16 No. 7 pp. 2053-2054.

*Primary Examiner*—David H. Malzahn
*Attorney, Agent, or Firm*—George E. Clark

[57] ABSTRACT

A high speed multiplier includes a logic circuit for performing multiplication a multiplicand stored in a first resister and a multiplier stored in a second register, which includes means connected to the second register for selectively gating a selected portion of a multiplier stored in the second register to a recoding means; shift gate means connected to outputs of the first register and controlled by outputs of the recoding means to gate selected groups of multiples of the multiplicand to an adder means for adding a group of multiples of the multiplicand under the control of the control signals; means for accumulating successive intermediate products generated by the adder means; spill adder means, connected to the means for accumulating, for generating a low order portion of a final result of the multiply; storage means for storing the low order portion of the final result; means for generating a high order portion of the final result from outputs of the means for accumulating; and means for storing the high order portion of the final result, wherein the multiplier operates at a rate double the system clock frequency on a 10 bit wide data path on each such double frequency cycle.

11 Claims, 3 Drawing Sheets

BASIC CYCLE-TIMING DIAGRAM

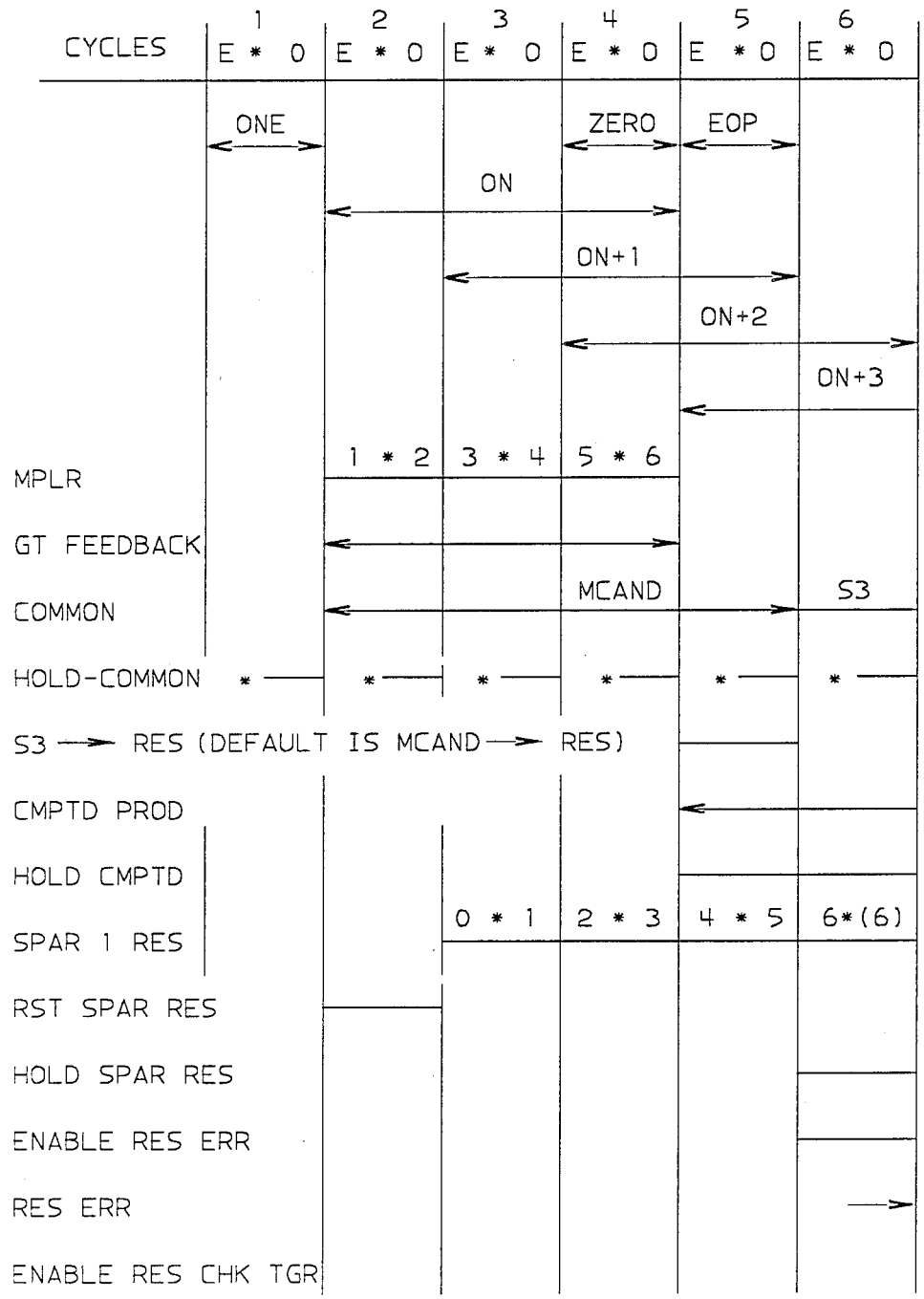

HIGH SPEED MULTIPLIER

BACKGROUND OF THE INVENTION

1. Field of the Invention

The present invention relates to information handling systems, and more particularly to multibit high speed multipliers for use in large processors in information handling systems.

2. Description of the Prior Art

The following are systems representative of the prior art.

Weinberger, U.S. Pat. No. 4,463,439, shows a carry save adder of a type which could be used to implement the 5-2 adder and 4-2 adder which form component parts of a preferred embodiment of the present invention.

The patent does not teach a high speed multiplier in accordance with the present invention.

Letteney, et. al., U.S. Pat. No. 4,228,520, is a prior art high speed multiply apparatus which has a first stage of 4-2 carry save adders which then feed four bit parallel adders each having four sum outputs and a carry output frm the highest order bit position. The 4 bit parallel adders function as a 2-1 adder.

A preferred embodiment of the present invention employs 5-2 carry save adder for the first stage with a next stage consisting of a 4-2 carry save adder and then a spill adder for a first part of a result and a full adder for a second part of a result wherein the logic is run at a double frequency clocking rate to achieve a performance of 20 bits per cycle as compared to 8 bits per cycle for the apparatus disclosed by the patent.

Schomberg, U.S. Pat. No. 4,549,280, emphasizes parity checking and modularity of the invention for use as a building block in a large scale system wherein the data flow is described as being used in a true pipeline without feedback.

The present invention as embodied in the preferred embodiment to be described herein, employs an interactive method for achieving high speed multiplication which includes feedback of partial results. Further, the apparatus, according to the present invention, does not employ parity checking but rather uses residue for checking.

As can be seen from the above discussion none of the prior art teaches the present invention.

SUMMARY OF THE INVENTION

Therefore, it is an object of the present invention to multiply two numbers stored in first and second registers respectively, by a high speed multiplier circuit including a logic circuit for performing multiplication on a multiplicand stored in a first register and a multiplier stored in a second register, which includes means connected to the second register for selectively gating a selected portion of a multiplier stored in the second register to a recoding means; shift gate means connected to outputs of the recoding means to gate selected groups of multiples of the multiplicand to an adder means for adding a group of multiples of the multiplicand under the control of the control signals; means for accumulating successive intermediate products generated by the adder means; spill adder means, connected to the means for accumulating, for generating a low order portion of a final result of the multiply; storage means for storing the low order portion of the final result; means for generating a high order portion of the final result from outputs of the means for accumulating; and means for storing the high order portion of the final result, wherein the multiplier operates at a rate double the system clock frequency on a 10 bit wide data path on each such double frequency cycle.

It is another object of the present invention to multiply a pair of numbers in a high speed multiplier circuit as above further including means for generating binary multiples of said first number to be used as intermediate operands.

It is yet another object of the present invention to multiply a pair of numbers in a high speed multiplier circuit as above in which the adder means further includes first means for adding a group of multiples of said first number; second means for adding carry and sum outputs of said first carry save adder and shifted outputs of said second means; and third means for adding carry and sum outputs from said second means for adding to generate a high order portion of a final result of said multiply operation.

Accordingly, a high speed multiplier circuit embodying the present invention includes method and apparatus for multiplying two numbers stored in first and second registers respectively, by a high speed multiplier circuit including a logic circuit for performing multiplication on a multiplicand stored in a first register and a multiplier stored in a second register, which includes means connected to the second register for selectively gating a selected portion of a multiplier stored in the second register to a recoding means; shift gate means connected to outputs of the first register and controlled by outputs of the recoding means to gate selected groups of multiples of the multiplicand to an adder means for adding a group of multiples of the multiplicand under the control of the control signals; means for accumulating successive intermediate products generated by the adder means; spill adder means, connected to the means for accumulating, for generating a low order portion of a final result of the multiply; storage means for storing the low order portion of the final result; means for generating a high order portion of the final result from outputs of the means for accumulating; and means for storing the high order portion of the final result, wherein the multiplier operates at a rate double the system clock frequency on a 10 bit wide data path on each such double frequency cycle.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 3 is a timing diagram for the residue checking cycle of the multiplier of FIG. 1.

In the drawing, like elements are designated with similar reference numbers, and identical elements in different specific embodiments are designated by identical reference numbers.

DESCRIPTION OF A PREFERRED EMBODIMENT OF THE INVENTION

Introduction

Algorithm

Basically, multiplication consists of repetitively generating a digit product (DP) and adding it to a running sum (RS) result. The following example will be used to illustrate principles and define terms.

EXAMPLE

The following example gives a numeric example of multiplication between two HEX numbers, each of four digits.

|  |  |
|---|---|
| 6 1 0 1 | multiplicand |
| 4 3 2 1 | multiplier |
| 0 6 1 0 1 | DP1 (first digit product) |
| 0 6 1 0(1) | RS1 (first running sum) |
| 0 C 2 0 2 | DP2 |
| 0 C 8 1(2,1) | RS2 |
| 1 2 3 0 3 | DP3 |
| 1 2 F 8(4,2 1) | RS3 |
| 1 8 4 0 4 | DP4 |
| 1 9 6 F(C,4 2 1) | RS4 |
| 1 9 6 F(C 4 2 1) | Final product: HIGH,(LOW) |

EXAMPLE: Hex Multiplication

A digit product is defined as that between one multiplier digit and the whole multiplicand. In the example, the first digit product or DP1 is 06101, a result between the multiplicand and the low multiplier digit, 1. Digit products are generated with every multiplier digit in ascending order. The process is like long hand multiplication except that, instead of saving all the DP's for addition at the end, a running sum is generated with each new DP. As in long hand, each succeeding DP is added to the running sum with a one digit left shift. Because of this shift, only zeros are added to the low order digit of the prior running sum. The low order digit of each running sum is therefore 'finished', and, in practice, 'spilled' out as it is generated (hence the term spill adder, etc.). In the example, four spill product digits are generated from four multiplier digits. They are, in ascending order, 1,2,4 and C, shown in parentheses, and constitute the low order half of the final product. The last running sum in the example is '196FC', of which '196F' represents a high order half of the final result.

HEX numbers are used in the example to illustrate the concept of a high radix, or 'super' digit as the unit of computation to gain speed.

Registers

In the discussion to follow, several Registers will be referenced. Registers A, B, and C are generally described as working registers and Register E is a control register for storing an instruction Operation Code (Op Code).

The operands to be multiplied by the multiplier according to the preferred embodiment of the present invention will be stored in Registers A and B and the result of the multiplication will be stored in Registers A and C with the low order portion of the result in the A Reg and the high order portion of the result in the C Reg.

PREFERRED EMBODIMENT OF THE PRESENT INVENTION

Figure 1:
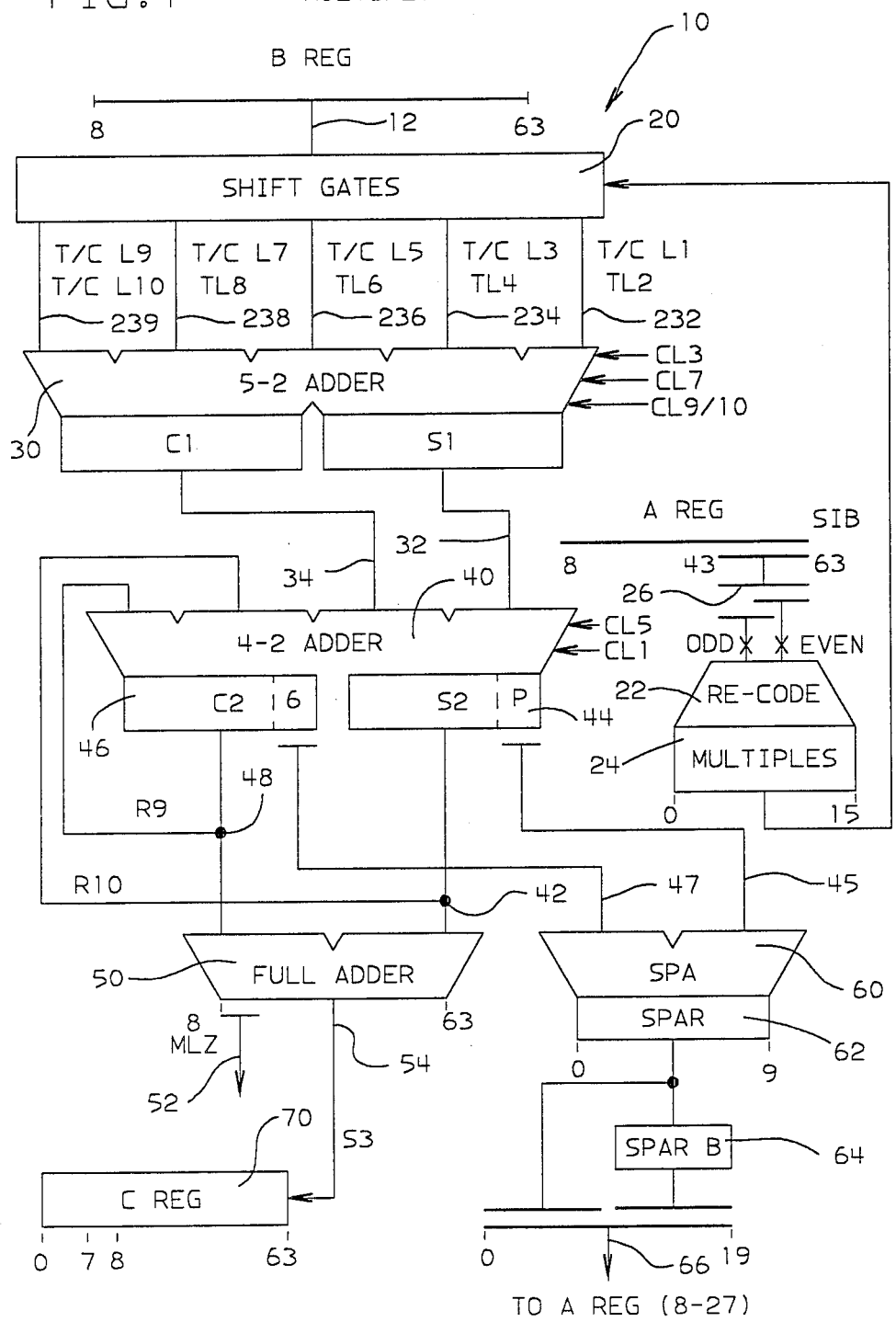
FIG. 1 is a block diagram of a preferred embodiment of a high speed multiplier in accordance with the present invention.

The high speed multiplier, according to the present invention, shown in FIG. 1, uses two sub-cycles, one for each 10 bit operation, to multiply at 20 bits per cycle. For comparison, the prior art uses three sub-cycles, and multiplies at 12 bits per cycle. The multiplier according to the present invention also eliminates one cycle by using a dedicated final adder, instead of sharing a parallel adder. Another cycle is removed by completing residue checking in an error reporting cycle. In the prior art, an extra cycle is required to wait for the completion of checking to allow retry.

The multiply operation is clocked at double the system rate, which is equivalent to having an extra clock pulse at system mid-cycle.

The internal function of the multiply device are controlled by hardware, consisting a sequence counter which is started and stopped by micro-orders 1⟶mpy and 0⟶mpy. Instruction dependent controls are provided by a pair of bits stored in an E register (not shown).

The multiplicand is set up in the B register, and remains there throughout the operation. The multiplier is set up in the A register, and accessed via a Shifter-In-Bus (SIB). The product result consists of two portions: A low order portion is generated in the spill adder registers or SPARS and transferred to the A register at a rate of 20 bits per cycle. A high order portion, the final running sum, is generated on the last product cycle and gated into C register 70 under microcode control.

Basic multiply cycles are a function of operand length, namely: one cycle for each 20 bits of operand, plus two cycles for the pipeline latency. In fixed point operations, a cycle is used to pre-shift the multiplicand while propagating its sign. Another cycle is needed for full word fixed point, for putting away the low order product with a required post-shift. In floating point, 0, 1 or 2 post-normalization cycles may be needed depending on operand contents. The following table gives cycles required for representative multiply operations:

| FLP (long, short) | |
|---|---|
| Normal operation | 5 |
| Pre-normalization | +5 |
| Post-norm, safe o/uflow | +1 |
| Post norm, possible o/uflow | +2 |
| Multiplier = 0 | 3 |
| Multiplicand = 0 | 4 |
| FXP | |
| FW (M, MR) | 6 |
| HW (MH) | 4 |

Statistically, 78% of floating point operations will be predicted to required no post-normalization. Of the 22% unpredicted, essentially all should require one post-normalization cycle, as those requiring two cycles are of marginal overflow or underflow condition. The average post-normalization cost is therefore 0.22 cycle.

Incoming operands are checked for, and outgoing results sent with odd parities. The multiply operation is checked by residues, i.e., comparing result residues between that generated from the actual product and the computed one from residues of the individual operands.

DESIGN CONSIDERATIONS

Sub-Cycles

The use of multiple sub-cycles enables the multiply function to be faster without a correspondingly higher circuits cost. The invention multiply employs two sub-cycles per machine cycle as compared to three used by a prior art multiplier.

Clocking

Due to its shortened cycle, the multiply clocks require, and are given, the following characteristics:
Smaller, 5NS clock widths
A special clock chip is used which generates latch and trigger clocks from a single clock input to minimize latch to trigger skew. As all 2F (double frequency) clocks are driven from this chip, 'internal' skew among the 2F paths are kept to a minimum.

Digit Size

The choice of ten bits per digit was based on timing and chip cost considerations.

Pipeline Platforms

Use of double rate clocking increases the number of L/T platforms, which takes away some of the circuits savings from multiplexing. The half- or m-cycle platforms in multiply are the Multiple Control Buffer, Digit Product, Running Sum, SPAR and SPARB. A notable design difference from the prior art is that in the preferred embodiment of the invention, the Multiples Controls are buffered instead of the actual (multiplicand) multiples. This provides considerable circuit saving, as the recoded (Multiples) controls are only 16 bits compared to five double words for five multiplicand multiples.

Final (Carry Propagate) Adder

In prior designs, the final addition of the individual sum and carry was performed in the common parallel adder of the execution element. An extra cycle as well as an extra 7-byte data bus are required to transfer the operands to the working registers.

In the preferred embodiment of the present invention, a dedicated adder is used which eliminates this cycle and data bus.

Other Optimization and Simplications

The data flow is customized to floating point, long multiplies. Where possible, differences required by other instruction types are handled by microcode instead of extra hardware. The following is a summary of simplification or improvements implemented in the preferred embodiment of the invention.

All multiply function registers are cloced at m-cycle (2F) rate. Full cycle changes are effected by 'holds'. By computing residue at m-cycle rate, a half cycle is eliminated from the check pipeline. This enabled removal of a final null cycle required by the prior art to complete checking.

Floating point short is handled as a long, thereby giving up one cycle which could have been saved by virtue of its shorter length. This is justified on the basis of its relative low occurrence and hardware savings. Specifically, as floating point operands are set up in the high-order word positions, a separate 2-digit (21-bit) bus would have been required from the A register to access the multiplier. Elimination of this bus reduces extra inputs and gates on the recode chip.

Hardware sign extension of fixed point multiplicand to floating point length is eliminated. Instead, sign extension is accomplished as part of a left pre-shift cycle to position the final result on word boundaries (if the letter is not done, a post-shift cycle would have been required anyway on putaway). For fixed point full word, the high and low halves of the final product are put away on separate cycles to save a shift and merge cycle, but the instruction is no longer wrappable.

At 10 bits per iteration, 60 multiplier bits are processed in six iterations. In order to keep operands and results left justified for floating point, the multiplier is appended with four low order zeros for all multiply instructions. The low order zero implies no initial borrow, and consequently no need of a 'preliminary' iteration as used by the prior art.

Special data flow and controls are added to do post normalization in one cycle. Both the shifter and the serial adder are given orders conditional on whether there is a leading zero hex digit in the high order product. Bits 8-11 of the A register are concatenated as bits 64-67 of the SIB for this operation.

Zero operands are detected early by microcode for floating point instructions. The remaining instruction dependency in the hardware is E register bits 2 and 3, which signify floating point and (fixed point) full-word respectively. These bits are used for control of sign propagation and sequence checking.

Extended operand multiplications are performed as one to four complete multiplies, in contrast to the prior art which accumulates results of multiplies and residues across the partial multiplies. Checking effectiveness is doubled as each sub-multiply is individually checked instead of by pairs.

Data Flow Description

Figure 2:
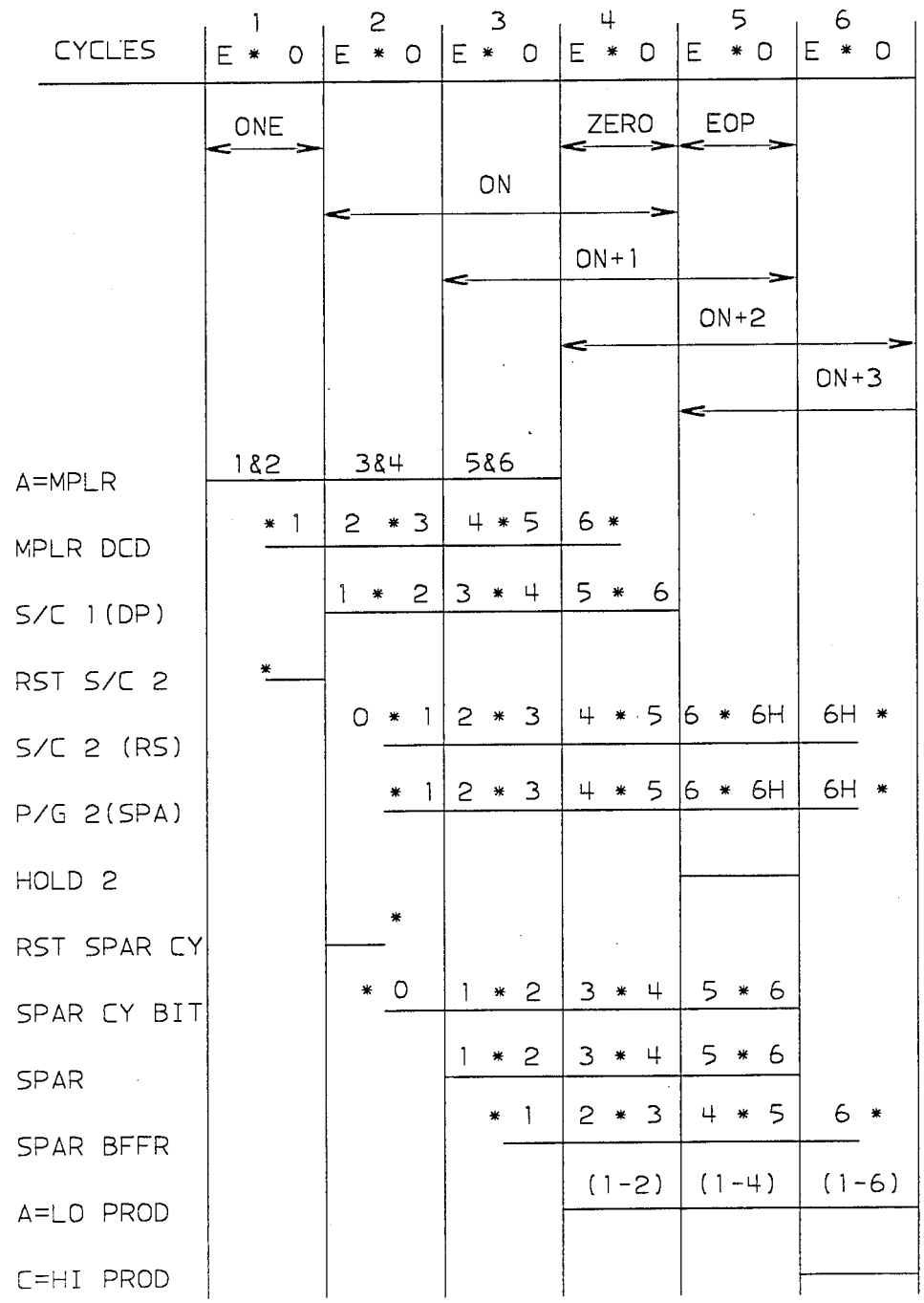
FIG. 2 is a cycle timing diagram for the multiplier of FIG. 1.

A data flow diagram of a multiplier 10 in accordance with a preferred embodiment of the present invention is shown in FIG. 1. The multiply cycle timing is shown in the timing diagram of FIG. 2.

Multiply begins with the multiplicand and multiplier set in the B and A registers respectively. The former remains in the B register throughout the operation; the latter is accessed via the 21 low end bits of the Shifter-In-Bus (SIB). Twenty new bits are made available every cycle through use of the shifter. Recoder 22, operating at double system rate, takes the low and high order 11 bits of the multiplier bus 26 (with a 1-bit overlap) on alternating half or sub-cycles and re-codes them into five groups of true or complement binary multiples. The 16-bit result, latched into multiples register 24, controls the selection of five multiples 232, 234, 236, 238, and 239 of the multiplicand on B Reg. output bus 12 into a 5-2 CSA 30 (carry-save adder). The sum 32 and carry 34 outputs, latched, represent the 'digit product' of a 10-bit multiplier digit and the full multiplicand. Successive digit products are accumulated through the 4-2 CSA 40, which adds each new digit product to the running accumulation (fed back shifted right—10 on sum output 42 of 4-2 CSA 40). A succeeding low-order ten bits of the final result are generated each sub-cycle from the accumulator 44, 46 and 'spilled' off into a SPILL adder 60, then latched into the spill adder register (SPAR) 62. A SPAR buffer SPARB 64 is used to stage the results so that a 20-bit result is returned on bus 66 every machine cycle to the A register. After all Multiplier bits have been processed, which would be in six (sub-cycle) iterations, the accumulator 44, 46 contains the high order half of the final result. Its sum on bus 42 and carry on bus 48 components are added through a full adder 50 to the C register (not shown) in a full cycle.

Digit Multiplication

The digit product can basically be formed by adding the multiplicand as a function of bits in the multiplier digit. Individual multiplicands are added with left shifts which correspond to the placement values of the respective multiplier bits. This method, however, require an adder with as many input ports as bits in a digit. Multiplier re-code (or decode) has been used in the IBM 3033 processor, to reduce adder requirement by a factor of two.

Recoding in terms of the reassigned bit values, taking the digit as a whole, is stated as follows: One extra higher order bit beyond the digit is used. This bit will be called the borrow ahead or 'borrow' bit. Bits in the multiplier digit are given their true binary values except the borrow bit and the low order bit, the latter also being the borrow bit of the prior (lower order) digit. The borrow bit is given the negative of its true value. The low order bit receives double its face value, the extra unit-value being used to replace the borrow from the next lower digit. Relative re-coded bit values of the digit with borrow are: '−1024 512 256 128 64 32 14 8 4 2 2'.

Multiplier Re-Code

Eleven multiplier bits re-code to five control groups. Re-coded values of the five groups are:
Group ½: TL1, CL1, TL2
Group ¾: TL3, CL3, TL4
Group 5/6: TL5, CL5, TL6
Group ⅞: TL7, CL7, TL8
Group 9/10: TL9, CL9, TL10, CL10

In the above, T and C mean true and complement respectively; and Lxx means a left shift of xx bit positions. The difference made by conditional re-code is elimination of one code point from each of the four low order groups, namely: CL2, CL4, CL6 and CL8.

Conditional recoding serves to reduce the number of code points from 4 to 3, by eliminating the negative of the double multiple, illustrated below, where input bits are H (high), L (low) and Bin (borrow-in). Output recode multiples and borrow-outs are as shown for conditional recode, with unconditional recode shown next to them in parentheses. Note that the only difference in conditional recode is for an input of 1 0 0, which decodes to a value of 2 with no borrow-out, as compared to a decode of −2 with borrow-out.

| input bits | | | recode | borrow |
|---|---|---|---|---|
| H | L | Bin | out | out |
| 0 | 0 | 0 | 0 | 0 |
| 0 | 0 | 1 | 1 | 0 |
| 0 | 1 | 0 | 1 | 0 |
| 0 | 1 | 1 | 2 | 0 |
| 1 | 0 | 0 | 2(−2) | 0(1) |
| 1 | 0 | 1 | −1 | 1 |
| 1 | 1 | 0 | −1 | 1 |
| 1 | 1 | 1 | 0 | 1 |

Borrow-in's are, of course, the borrow-outs of the next lower group, hence a function of all multiplier bits, starting at the Bin position and lower. The illustration below shows the the the five recode groups, with conditional borrows: b2, b4, b6 and b8.

| bit | 10 | 9 | 8 | 7 | 6 | 5 | 4 | 3 | 2 | 1 | 0 |
|---|---|---|---|---|---|---|---|---|---|---|---|
| | | | | | | | | | 2 | 1 | 0 |
| | | | | | | | 4 | 3 | b2 | | |
| | | | | | 6 | 5 | b4 | | | | |
| | | | 8 | 7 | b6 | | | | | | |
| | 10 | 9 | b8 | | | | | | | | |

The logical expressions for these borrows are given below, where bits are represented by their position index:
b2=2 AND (1 OR 0)
b4=4 AND (3 OR b2)
b6=6 AND (5 OR b4)
b8=8 AND (7 OR b6)

In an actual implementation where speed is a factor, the above would be implemented with borrow 'look ahead' whereby all borrows are generated in parallel instead of rippled from low to high.

Multiples Shift-Gates 20

All multiples, being powers of 2, are generated by shift-gates 20. There is a set of shift gates for each control group. the number of shift gates is proportional to the number of decode points. Conditional re-code reduces code points, and hence gates, by a factor of four to three, but with a slight speed penalty due to the wider decode.

Carry-Save Adders 30, 40

A digit product is formed by adding the five multiples, 232, 234, 236, 238, and 239. A 5-2 carry save adder 30 is used to generate the result in one sub-cycle. A 4-2 adder 40 is used to accumulate partial products from iteration to iteration. Both the 4-2 and 5-2 carry-save adders 30 and 40 may be implemented by circuits shown in Weinberger, U.S. Pat. No. 4,463,439. A variation is used in the spill section of the 4-2 adder 40 where, instead of latching the sum and carry results, 42, 48, 'propagates' 45 and 'generates' 47 are latched to reduce path length through the spill adder 60.

Sign Propagation

The multiplicand sign is extended in the process of becoming the various multiples. Presumable, the sign position moves leeward from the five way addition. The lowest possible sign position of 5-2 adder 30 is one whose inputs are all signs. Extension is kept to a minimum by connecting the highest order bits among the adder inputs to carry generating logic. Doing this, sign of the multiples only extends to bit −3, which is one bit beyond the maximum multiple (Negative indexing starts leeward of bit 0). By similar reasoning, sign of the inputs to 4-2 adder 40 must extend to bit −4, and that to final adder 50 extends to bit −5. At four bits per chip, fifteen chips are used, covering an output range between bits −6 and 53. The different sign extensions required by the high order chips are provided by programming them as functions of their bit slice positions, using (E REG bit 2)=0 to signify fixed point. Note that sign of the floating point fraction is always positive (zero). Fixed point sign occupies bit positions 8–28 as a result of the left four pre-shift cycle with extension to double word. Redundant signs of the running sum are utilized to share in the high-fan-out driving. Sign propagation for the digit product is also performed as a function of the bit slice position.

Hot 1'S Insertion

The conversion of the binary number to its negative equivalent in two's complement notation consists of adding a low order or hot' one to the (one's) complement of the number. Consequently, each of the five multiples inputs requires a corresponding hot one input. Hot 1's are inserted to different low order bit positions at different stages of the pipeline, to be described in the spill adder section.

Spill Adder 60

The spill section refers to the low order ten bits, 54–63 of the data flow. Advantage is taken of the fact that low order zeros are created by the left shifted multiplicands, so that the number of addends reduced from five, at bit 54, to one, at bit 63. The ten-bit slice is vertically partitioned to two chips. The first chip contains through the digit product; the second continues through to the SPAR and SPARB. The implicates along the spill pipeline are shown in the following chart with the previously mentioned hot 1's.

higher bit positions. H1 is inserted as an input to the spill pre-adder, also with a one cycle delay. It should be explained that although the SPAR is one cycle later than the running sum registers, the spill pre-adder inputs are in the same cycle as that of the running sum. The equivalent running sum platforms in the spill section are the propagate and generate registers. This is done to help the spill (carry propagate) adder long paths.

The components propagate 45 and generate 47 are added by the spill adder to the spill adder register SPAR 62. The SPAR 62 result is buffered in the SPAR buffer, SPARB 64. This enables twenty bits to be returned each whole cycle to the A register, by concatenating the contents of SPAR 62 and SPARB 64. The transfer to the A register is a half-cycle path which can be seen in the cycle timing diagram.

Post-Normalization

As operands are always normalized before multiply begins, the product fraction is either normalized, or may contain at most one hex zero. A test is performed by micro-code on the original operands through a parallel adder function to pre-determine the cases which will not require post normalization. No extra cycles are required in these cases, which should occur statistically

| BIT POSITIONS | HOT 1'S INSERTION | | | | | | | | | |
|---|---|---|---|---|---|---|---|---|---|---|
| | 54 | 55 | 56 | 57 | 58 | 59 | 60 | 61 | 62 | 63 |
| DIGIT PRODUCT ADDER | | | | | | | | | | |
| L1/2 | * | * | * | * | * | * | * | * | * | CLI |
| L3/4 | * | * | * | * | * | * | * | CL3 | CL3 | |
| L5/6 | * | * | * | * | * | CL5 | CL5 | CL5 | H3 | |
| L7/8 | * | * | * | | | | | | | |
| L9/10 | * | | | | | | | | | |
| TOTAL INPUTS | 5 | 4 | 4 | 3 | 3 | 3 | 3 | 3 | 3 | |
| INT CARRY IN | <—H9/10 | <—H7 | | | | | | | | |
| RUNNING SUM ADDER | | | | | | | | | | |
| PRE-SUM | * | * | * | * | * | * | * | * | * | * |
| PRE-CARRY L1 | * | * | * | * | * | * | * | * | | |
| RUNNING-S | * | * | * | * | * | * | * | * | * | * |
| RUNNING CARRY | * | * | * | * | * | * | * | * | * | * |
| TOTAL INPUTS | 4 | 4 | 4 | 4 | 4 | 4 | 4 | 4 | 3 | 3 |
| INT CARRY IN | | | | | | | | <—H5 | | |
| SPILL ADDER | | | | | | | | | | |
| RUNNING SUM | * | * | * | * | * | * | * | * | * | * |
| RUNNING CARRY | * | * | * | * | * | * | * | * | * | H1 |
| TOTAL INPUTS | 2 | 2 | 2 | 2 | 2 | 2 | 2 | 2 | 2 | 2 |
| | | | | | | | | | | <— SPAR CARRY |

Normal inputs to adders are indicated by asterisks in the bit positions. Hot 1's are indicated by Hx's where x is the left shift associated with the complement multiple. Note that H9/10 is inserted as an intermediate carry-in to bit 54. Advantage is taken of the fact that the 5-2 adder of bit 54 can accept two carries, but receives only one from bit 55, a 4-2 adder. Similarly, H7 is inserted as a carry to bit 56, using the port left vacant from the 4-2 adder being followed by a 3-2 adder. The next free carry-in port is to bit 61 of the running sum adder. H5 is inserted there (with a one cycle delay to keep it in synchronism with the correct iterations). Note also the H5 is not inserted to bit 58, the low order position of CL5, but to bit 61, by adding low order zeros indicated by the symbol CL5. This is also done with H3 and H1 which normally belong at bit 58 and 62 respectively. Instead, they are inputted as addends to bits 62 and 63. These are done to avoid raising the number of adder ports by one in the respective bit positions, which would have caused additional carries in turn, removing free ports at 78% of the time.

The multiply leading zero (MLZ) signal 52 is generated on the high order slice of the common chip to the shifter and to the control store. A "one" causes a L4 shift with the L4*MLZ micro-order, otherwise zero. Bits 8-11 of the A register, which is the hex digit being moved in to fill the concatenated position by the left shift, is gated to the shifter input positions 64-67 with this operation. A MLZ trigger is set at the shifter which controls whether a one or zero is substracted from the exponent with the −MLZ order. Lastly, the MLZ signal controls the branch order MLZ.

High Order Product Parity Generation

Parities of the final running sum, or S3, are generated conditionally as a function of carry in and formed on the carry look ahead chip. This is done for speed, by avoiding an extra chip crossing.

Multiply (Residue) Check

The multiply function is checked by comparing (S3) residues between that of the product and one computed from the residues of the operands. Additionally, residue results are generated for each of the three decode values and checked for odd occurrence among them. The cycle timing of the residue function is illustrated in FIG. 3.

Actual Product Residue

The actual product consists of the final running sum, also referred to as S3, and all the spill product digits. Residue of the latter is accumulated serially with the SPAR results. Note from above figure that residues of S3 and SPAR are set into individual registers at cycle 6, the putaway cycle. This is made possible, because the bulk residue reduction has been completed half a cycle earlier, making it feasible to do a final 3-bit residue addition and comparison in time to stop the trigger clock in case of an error.

Computed Result Residue

Computed residue is obtained by generating residues of the operands individually and multiplying them, using residue arithmetic.

The multiplier residue is checked by accumulating the sum over the operand as the digits are accessed. Residue is computed from the multiple decodes 24 instead of directly from the multiplier. Because the borrow bit of each digit is interpreted as a sign, the final residue is automatically correct without keeping tab on the actual arrival of the sign.

The multiplicand time shares the residue reduction tree and registers (labeled 'common' in FIG. 3) with the final sum, S3. Multiplicand residue is generated to the 'common' continously except when S3 is enabled. The computed residue is generated one sub-cycle after the multiplier residue is available, and held until used for comparison with that of actual product.

Multiplier Re-Code Check

Because the multiplier residue is calculated from the re-coded multiplier, the re-code process is outside of the residue checking and consequently is independently checked for odd decode.

Odd-Even Cycle Counter

The double frequency clock is synchronized to the general system clock into odd and even sub-cycles, the even cycle being the one which beings with the system clock, the odd one beginning at mid-cycle, The micro-order EOP is chosen as the synchronizing source because of its guaranteed appearance. Synchronization is accomplished as EOP resets the odd-even counter to even. The reset is a half-cycle path, causing two consecutive sub-cycles to be even.

Control Sequence Counters

The multiply control sequence is started and terminated by the micro-orders 1→mpy and 0→mpy; the first sets the multiply 'on' trigger, and the second resets it. Up to three cycles from the beginning and end of the ON period are controllable with additional triggers ON+1 through ON+3. As 1→MPY resets accumulating registers, it it also used for resetting and re-initializing the multiply sequence when it is interrupted, as by a micro-code branch for pre-normalization.

Thus, while the invention has been described with reference to preferred embodiments thereof, it will be understood by those skilled in the art that various changes in form and details may be made without departing from the scope of the invention.

What is claimed is:

1. A high speed multiplier circuit for performing multiplication of first and second numbers stored in first and second registers respectively, comprising:
   a recoding means;
   means for generating a clock signal at a frequency equal to an even multiple of a system clock frequency to provide a plurality of clock pulses within each system clock cycle;
   means connected to said second register for selectively gating a selective portion of said second number stored in said second register to said recoding means at a rate equal to an even multiple of said system clock frequency under the control of said means for generating a clock signal;
   shift gate means connected to outputs of said first register and controlled by control signal outputs of said recoding means to output selected groups of bits at a rate equal to an even multiple of said system clock frequency under the control of said means for generating a clock signal;
   adder means connected to outputs of said shift gate means, for adding a group of multiples of said first number, under the control of said control signals and for generating output signals from said adder means;
   spill adder means, connected to outputs of said adder means for generating a low order portion of a final result of said multiplication;
   storage means for storing said low order portion of said final result;
   means for generating a high order portion of said final result from outputs of said adder means; and
   means for storing said high order portion of said final result such that such final result is stored at least in a first half of said system clock cycle to increase the speed of operation of said multiply circuit.

2. A high speed multiplier circuit for performing multiplication of first and second numbers according to claim 13, wherein said shift gate means further comprises:
   means for generating binary multiples of said first number to be used as intermediate operands.

3. A high speed multiplier circuit for performing multiplication of first and second numbers according to claim 13, wherein said adder means, comprises:
   first means for adding a group of multiples of said first number;
   second means for adding carry and sum outputs of said first means for adding and shifted outputs of said second means; and
   third means for adding carry and sum outputs from said second means for adding to generate a high order portion of a final result of said multiply operation.

4. A high speed multiplier circuit for performing multiplication of first and second number according to claim 3, wherein:
   said first means comprises a 5-2 carry save adder;
   said second means comprises a 4-2 carry save adder; and
   said third means comprises a full adder.

5. A method for multiplying first and second multibit numbers, each comprising one or more multibit digits, stored in first and second registers, comprising the steps of:

generating a clock signal at a frequency equal to an even multiple of a system clock frequency to provide additional clocking pulses in a system clock cycle to speed the operation of said method for multiplying;

recoding a predetermined portion of said second number;

generating a plurality of control signals from said recoded portion of said second number;

controlling the selection of a plurality of multiples of said first number by said control signals;

adding, in an adder means a group of said multiples of said first number under the control of said control signals at a clock rate controlled by said generated even multiple clock signal;

accumulating successive products generated by said adding steps;

spilling a low order portion of said accumulated products to a spill adder on each cycle of said multiply operation to generate a low order portion of a final result of said multiply;

storing said low order portion of said final result in a low order result register;

repeating said above steps on successive portions of said second number until all bits in said second number have been processed by the above steps; and storing a final accumulated product in a result register as a high order portion of said final result of said multiply of said first and second numbers.

6. A method according to claim 5, wherein said multiple of said system clock frequency is two.

7. A method according to claim 5, further comprising the step of:

inserting, under the control of said control signals, ones in predetermined positions in operands input to said adder means to obtain an output in twos complement form.

8. A method according to claim 5, further comprising the steps of:

generating, under the control of said control signals, binary multiples of said first number to used as intermediate operands.

9. A method according to claim 5, wherein said adding step further comprises:

first adding a group of multiples of said first number in a first carry save adder;

second adding carry and sum outputs of said first carry save adder and shifted outputs of a second carry save adder in a second carry save adder to accumulate said successive products; and third adding carry and sum outputs from said second carry save adder in a full adder to generate a high order portion of said final result.

10. A method according to claim 5, wherein each said multibit digit is comprised of ten binary bits.

11. A method according to claim 5, further comprising the step of:

checking, after said step of storing said final result, the accuracy of said final result by comparing a residue computed from said final result with a residue computed from said first and second numbers.

* * * * *